United States Patent
Singhal (10) Patent No.: US 9,916,862 B2
(45) Date of Patent: *Mar. 13, 2018

(54) METHOD AND APPARATUS FOR EDITING VIDEO SCENES BASED ON LEARNED USER PREFERENCES

(71) Applicant: Adobe Systems Incorporated, San Jose, CA (US)

(72) Inventor: Puneet Singhal, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,842

(22) Filed: Nov. 30, 2016

(65) Prior Publication Data

US 2017/0084307 A1    Mar. 23, 2017

Related U.S. Application Data

(63) Continuation of application No. 14/266,987, filed on May 1, 2014, now Pat. No. 9,557,829.

(51) Int. Cl.
| | |
|---|---|
| *G11B 27/00* | (2006.01) |
| *G11B 27/031* | (2006.01) |
| *H04N 5/222* | (2006.01) |
| *G06K 9/00* | (2006.01) |
| *G06F 3/033* | (2013.01) |
| *H04N 5/262* | (2006.01) |

(Continued)

(52) U.S. Cl.
CPC ............ *G11B 27/031* (2013.01); *G06F 3/033* (2013.01); *G06K 9/00* (2013.01); *G06K 9/00744* (2013.01); *G06K 9/00758* (2013.01); *G06K 9/6254* (2013.01); *G11B 27/28* (2013.01); *H04N 5/2224* (2013.01); *H04N 5/262* (2013.01)

(58) Field of Classification Search
CPC ... G11B 27/37; G11B 27/034; G11B 2220/90; G11B 27/024; G11B 2220/20
USPC ....................................................... 386/282
See application file for complete search history.

(56) References Cited

U.S. PATENT DOCUMENTS

| | | | |
|---|---|---|---|
| 2006/0268180 A1* | 11/2006 | Chou ..................... | G06T 5/009 348/673 |
| 2008/0112683 A1 | 5/2008 | Lin et al. | |

(Continued)

OTHER PUBLICATIONS

U.S. Appl. No. 14/266,987, dated Dec. 24, 2015, Preinterview 1st Office Action.

(Continued)

*Primary Examiner* — William C Vaughn, Jr.
*Assistant Examiner* — Daniel Tekle
(74) *Attorney, Agent, or Firm* — Keller Jolley Preece (57) ABSTRACT

A computer implemented method and apparatus for editing video scenes based on learned user preferences. The method comprises identifying a plurality of scenes in a video; for each scene of the plurality of scenes: applying an effect to a representative frame of a scene, wherein the effect is based on learned user preferences; receiving an input that adjusts at least one effect on the representative frame; updating user preferences based on received input; and applying the at least one effect to all frames of the scene; interpolating the adjusted at least one effect at a boundary of two consecutive scenes; and applying the interpolated at least one effect to transitional frames between the two consecutive scenes.

20 Claims, 3 Drawing Sheets

(51) Int. Cl.
*G11B 27/28* (2006.01)
*G06K 9/62* (2006.01)

(56) References Cited

U.S. PATENT DOCUMENTS

2011/0206351 A1* 8/2011 Givoly ................ G11B 27/034
386/283
2015/0318019 A1 11/2015 Singhal

OTHER PUBLICATIONS

U.S. Appl. No. 14/266,987, dated May 6, 2016, 1st Action Interview Summary Office Action.
U.S. Appl. No. 14/266,987, dated Sep. 12, 2016, Notice of Allowance.

* cited by examiner

METHOD AND APPARATUS FOR EDITING VIDEO SCENES BASED ON LEARNED USER PREFERENCES

CROSS REFERENCE TO RELATED APPLICATIONS

The present application is a continuation of U.S. application Ser. No. 14/266,987, filed May 1, 2014. The entire contents of the foregoing application are hereby incorporated by reference in its entirety.

BACKGROUND OF THE INVENTION

Field of the Invention

Embodiments of the present invention generally relate to video editing and, more particularly, to techniques for editing video scenes based on learned user preferences.

Description of the Related Art

Currently, video adjustments to, for example, the contrast and brightness of a video are applied to the entire video as a whole. This often provides undesirable results. For example, a decrease in brightness in one scene, when applied to the entire video makes dark scenes of the video darker. An increase in brightness in one scene makes other bright scenes of the video brighter. One option to avoid such undesirable results includes applying different brightness to different scenes. However, a user must adjust each scene of each video manually in order to achieve a desired result. This results in wasted time and effort on the part of the user. Therefore, there is a need for a method and apparatus for editing video scenes based on learned user preferences.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for editing video scenes based on learned user preferences is described. The method identifies a plurality of scenes in a video. For each scene of the plurality of scenes, the method applies an effect to the representative frame of the scene, wherein the effect is based on learned user preferences. The method receives an input that adjusts at least one effect on the representative frame, updates user preferences based on the received input, and applies the adjusted at least one effect to all frames of the scene. When all scenes have been processed, the method interpolates the adjusted at least one effect at a boundary of two consecutive scenes and; and applies the interpolated at least one effect to transitional frames between the two consecutive scenes.

In another embodiment, an apparatus for editing video scenes based on learned user preferences is described. The apparatus comprises an adjustment module for identifying a plurality of scenes in a video. For each scene of the plurality of scenes, the adjustment module identifies a representative frame for the scene and applies an effect to the representative frame of the scene, wherein the effect is based on learned user preferences. The adjustment module receives an input that adjusts at least one effect on the representative frame and applies the adjusted at least one effect to all frames of the scene. When all scenes have been processed, the adjustment module interpolates the adjusted at least one effect at a boundary of two consecutive scenes; and applies the interpolated at least one effect to transitional frames between the two consecutive scenes.

In yet another embodiment, a computer readable medium for editing video scenes based on learned user preferences is described. The non-transient computer readable medium stores computer instructions that, when executed by at least one processor causes the at least one processor, perform the method for editing video scenes based on learned user preferences.

While the method and apparatus is described herein by way of example for several embodiments and illustrative drawings, those skilled in the art will recognize that the method and apparatus for editing video scenes based on learned user preferences is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for editing video scenes based on learned user preferences defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for editing video scenes based on learned user preferences. Embodiments of the present invention automatically apply adjustments to each scene of a video, rather than to the video as a whole. The embodiments identify scenes of a video and process the scenes individually. For each scene, a representative frame of the scene is selected for processing. The adjustments to one or more effects that are made to the representative frame are applied to all frames of the scene. Extreme versions of the representative frame are generated and displayed to the user. The extreme versions show the representative frame with, for example, high contrast/high brightness, high contrast/low brightness, low contrast/high brightness, and low contrast/low brightness. The extreme versions of the representative frame are displayed, for example, over corners of the representative frame. A pointer is provided to the user via a graphical user interface. The pointer enables the user to select a desired level of contrast/brightness. As the user moves the location of the pointer over the representative frame, the levels of contrast/brightness are adjusted based on the location of the pointer.

A user selected desired level of contrast/brightness is applied to each frame of the scene. The process is repeated for each scene of the video. In order to ensure a seamless transition between scenes, the brightness/contrast levels at the boundary of two scenes are interpolated and applied to transitional frames (i.e., a last number of frames of a first scene and a first number of frames of a second scene). The user selected desired level of contrast/brightness for each scene is used to learn the user's preferences. Thus, when a user later edits a new scene, the learned user preferences are used to automatically adjust the level of brightness and contrast of the new scene based on the user's preferences. Any new adjustments performed by the user are used to update the learned user preferences. Although the present disclosure describes video adjustments in terms of changes in brightness and contrast, those skilled in the art will appreciate that the present invention may apply to any video adjustments, such as changes in saturation, hue, and the like.

As previously explained, existing solutions apply video adjustments to a video as a whole. In addition, existing solutions fail to learn a user's preferences thereby making video adjustments an unnecessarily time consuming activity.

Thus, and in accordance with an embodiment of the present invention, techniques are provided herein that allow for editing video and learning user preferences based on prior adjustments. A set of sample images (e.g., 250 images) is provided to the user's computer. Each sample image includes data corresponding to "extreme" versions of the sample images. An interpolation of the extreme versions of the same image can be used to generate a "good" version of each sample image. The "good" version of a sample image may be, for example, a version adjusted to what a professional photographer would consider ideal for the sample image. The good version has what is perceived to be ideal brightness, contrast, and the like. The data corresponding to the "extreme" versions of each sample image may provide combinations of adjustments to the sample image. Examples of "extreme" versions include the image with setting, such as lighting settings adjusted to their extreme values. For example, an extreme version has it setting adjusted to, for example, a lowest brightness/lowest contrast version, a lowest brightness/highest contrast version, a highest brightness/lowest contrast version, and a highest brightness/highest contrast version. These extreme versions are stored as lookup tables. Each lookup table is an array of data points that map lighting changes in an image towards their extreme values. Each pixel of an image may be represented in Red/Green/Blue (RGB) color space. A pixel may, for example, have an RGB value of 5/10/15, indicating the amount of red/green/blue light emitted in the pixel. A lighting change for the pixel may be mapped to 7/14/20 as an extreme value. The mappings that represent lighting change are stored in the lookup table. There are four lookup tables associated with extreme versions of a sample image, where each lookup table represents one of the extreme versions of the sample image. These four lookup tables are used to assist a user in adjusting a video as described in further detail below.

When a user edits a video using video editing software, scene detection algorithms, well known by those of ordinary skill in the art, are used to identify a plurality of successive scenes of the video. Each scene may be of a different brightness, contrast, amount of motion, speed of a camera, and the like. As such, each scene must be processed individually, so the desired adjustment is applied to the current scene only. For each scene, an image from the scene, hereafter referred to as a representative frame, is selected for adjustment. In some embodiments, the representative frame is a frame in the middle of the scene. A feature descriptor (FD) is calculated for the representative frame. Generally, the FD is an identifier of an image. The FD identifies aspects of the image from low level descriptions of luminance distribution to high-level aspects such as face detection. Features may include intensity distributions, scene brightness, equalization curves, detail-weighted equalization curves, highlight clipping, spatial distributions, and faces. The FD may be computed using various techniques known in the art.

Once calculated, the FD of each sample image is compared to the FD of the representative frame. A weight is assigned to the sample image. The weight represents how similar the sample image is to the representative frame based on a comparison of the FDs. For example, a first sample image may have a weight of 0.3 and a second sample image may have a weight of 0.7, meaning the FD of the second image is more similar to the representative frame than the first image. The lookup tables of the sample images are interpolated based on the weight of each sample image. The lookup tables of each extreme version are interpolated with the lookup tables of the other extreme versions, respectively.

The interpolated extreme versions of the lookup tables that generate the "good" versions are applied to the representative frame to create a representative frame that is adjusted to a more ideal version of the representative frame. Extreme versions of the representative frame are created by applying the respective interpolated lookup tables of the extreme versions to the representative frame. The representative frame, as well as the extreme versions of the representative frame, are displayed. For example, the representative frame may be displayed with one of each of smaller thumbnails of the extreme versions displayed in the four corners of the representative frame. A user may move a pointer on the representative frame to adjust the brightness/contrast of the representative frame. Movement toward an extreme version of the image applies the extreme adjustment to the representative frame. For example, if a user moves a pointer toward the high brightness/high contrast version, the representative frame is displayed with higher brightness and higher contrast. The closer the pointer is to the high brightness/high contrast version, the more the brightness and contrast is increased in the representative frame.

The location where the user releases the pointer identifies the final brightness/contrast level desired by the user for the representative frame. A resultant lookup table is generated for the resultant image (i.e., the representative frame with the adjustment applied). An FD of the source image is stored. The location, for example, x,y coordinates of the pointer on the representative frame is stored with the FD as a user preference, in the form of, for example, FD: (x,y). The resultant lookup table (i.e., brightness/contrast level) is then applied to all frames in the scene of which the representative frame is a part.

When a new scene is to be processed, whether the new scene is another scene within the video or a scene in another video, the representative frame for the new scene is processed as describe above. However, because the user now has preferences stored, the FD of the representative image is compared to the FDs stored in the user preferences. The user preferences include an FD in addition to x,y coordinates of the final pointer position for the representative frame in one or more previously adjusted scenes. A weight vector is created based on the similarities of the FD of the representative frame of the new scene to FD of the representative images of the previously adjusted scenes. A weight vector compares the FD of the representative frame of the new scene to FDs stored in the user preferences. The weight vector is normalized to identify a starting location of the pointer the x,y coordinates for the representative frame of the new scene. The representative frame of the new scene is displayed with the four extreme versions of the representative frame. In addition, the pointer is automatically placed at the x,y coordinates making the adjustment experience easy for the user. Again, the location where the user moves the pointer identifies the final brightness/contrast level desired by the user for the representative frame. A resultant lookup table is generated for the resultant image (i.e., the representative frame with the adjustment applied). The location of the pointer on the representative frame is stored with the FD of the source image as a user preference and the resultant lookup table (i.e., brightness/contrast level) is applied to all frames in the scene of which the representative frame is a part.

The process is repeated for each scene of the video. When all representative frames of all scenes are processed, the scenes are rejoined. In order to avoid flickering at changes in scenes, the lookup tables at scene boundaries are interpolated. The interpolated lookup table is then applied to transitional frames of the scenes. In some embodiments, a number of transitional frames may be predefined. In some embodiments, a number of transitional frames may be a predetermined percentage of frames based on the number of frames in the scene. For example, a last ten frames of a first scene and a first ten frames of a second scene, making the transition between two scenes seamless.

Advantageously, the present invention may be provided as a plug-in to or include as part of video editing software, such as ADOBE® AFTER EFFECTS®, ADOBE® PREMIERE® Elements, ADOBE® PREMIERE® Pro, and the like. The present invention allows a user to adjust video on a scene by scene basis. In addition, the present invention learns a user's preferences thereby reducing the work and time required of the user when adjusting a video.

Various embodiments of a method and apparatus for editing video scenes based on learned user preferences are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
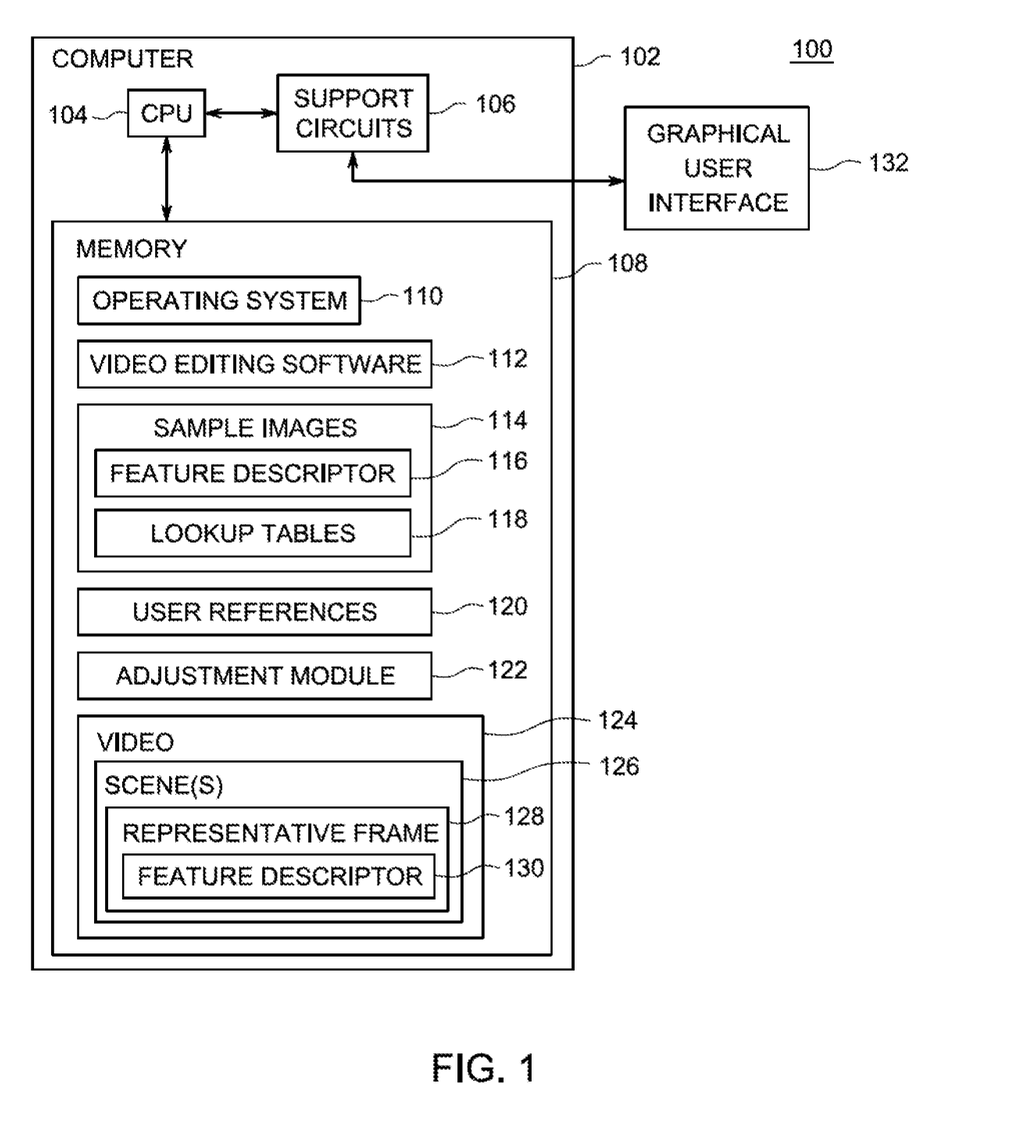
FIG. 1 is a block diagram of an apparatus for editing video scenes based on learned user preferences, according to one or more embodiments.

FIG. 1 is a block diagram of an apparatus 100 for editing video scenes based on learned user preferences, according to one or more embodiments. The apparatus 100 includes a computer 102. The computer 102 is a computing device, for example a desktop computer, laptop, tablet computer, smartphone, and the like. The computer 102 includes or is attached to a graphical user interface 132. The computer 102 includes a Central Processing Unit (CPU) 104, support circuits 106 and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, video editing software 112, sample images 114, user preferences 120, an adjustment module 122 and a video 124. Each of the sample images 114 includes a feature descriptor 116 and lookup tables 118. The video 124 includes one or more scenes 126. Each scene 126 includes a representative frame 128. The operating system 110 may include various commercially known operating systems.

The video editing software 112 may be any software, such as ADOBE® AFTER EFFECTS®, ADOBE® PREMIERE® Elements, ADOBE® PREMIERE® Pro, and the like, capable of editing video.

The sample images 114 are a large set of images (e.g., 250 images). Each of the sample images 114 includes data corresponding to "extreme" versions of the sample images 114. The data corresponding to the different versions of the sample images 114 includes adjustment parameters used to adjust each of the sample images 114 to each of the different versions. The data corresponding to the "extreme" versions of each of the sample images 114 may provide single or combinations of adjustments to each of the sample images 114 that, when applied, show each of the sample images 114 in the extreme version. For example, the extreme versions may be a low brightness/low contrast version, a low brightness/high contrast version, a high brightness/low contrast version, and a high brightness/high contrast version. For simplicity, example embodiments are discussed herein using a combination of brightness and contrast. However, it is contemplated that any number of one or more video adjustments are applicable to exemplary embodiments. These different versions are stored as lookup tables 118.

Each of the lookup tables 118 is an array that maps lighting changes in a sample image 114 to its extreme values. Each pixel of an image may be represented in Red/Green/Blue (RGB) color space. A pixel of an image may, for example, have a value of 5/10/15. A lighting change (i.e., adjustment) for the pixel may be mapped to 7/9/20. The mappings that represent lighting change are stored in the lookup tables 118. There may be four lookup tables 118 associated with each of the sample images 114, where each of four of the lookup tables 118 represents one of the extreme versions of the sample image 114. The sample images 114 may be transferred to the computer 102 via a network (e.g., Internet, wide-area network, local area network) or using a tangible machine readable storage device (e.g., CD-ROM).

When a user adjusts the video 124 using the video editing software 112, the adjustment module 122 uses scene detection algorithms, well known by those of ordinary skill in the art, to identify the plurality of scenes 126 of the video 124. For example, the adjustment module 122 may use both time code-based scene detection and content-based scene detection. Time code-based scene detection uses time codes in the video 124 to identify the scenes 126 of the video 124. When a new time/date stamp is detected in the video 124, a scene 126 is detected. Content-based scene detection analyzes the content of the video 124 to identify scene changes. For example, if the content-based scene analysis determines that a first scene was shot indoors and that a second scene adjacent to the first was shot outdoors, the content-based scene detection algorithm detects a scene change at the point where the content changed from indoors to outdoors. In some embodiments, separating the video 124 may involve creating a separate file in the memory 108 for each scene 126. In some embodiments, identifying the scenes 126 of the video 124 may involve storing only one file in memory 108 and designating scene changes within the file in memory 108.

Until a user adjusts a scene 126, the user may not have user preference 120 specified. As such, the first time a user adjusts a scene 126 of the video 124, the adjustment module 122 selects a representative frame 128 of the scene 126 for example, a frame in the middle of the scene 126. The adjustment module 122 calculates a feature descriptor (FD) 130 for the representative frame 128. An FD 130 is an identifier of the representative frame 128. The FD 130 is calculated for the representative frame. Generally, the FD is an identifier of an image. The FD may range from low level descriptions of luminance distribution to high-level aspects such as face detection. Features may include intensity distributions, scene brightness, equalization curves, detail-weighted equalization curves, highlight clipping, spatial distributions, and faces. The FD may be computed using various techniques. An FD 116 is also calculated for each of the sample images 114. An FD is 264 values that identify the factors, for example, a distribution of luminance, brightness, color intensity, color distribution, features, and the like. A comparison of FDs of two images identifies how similar the images are. For example, an FD from an image of a sunny beach and an FD from an image of another sunny beach are similar. The FD from the image of a cloudy beach is less similar to the FD from the image of the sunny beach. An FD from an image of an indoor scene compared to the FD from the image of the sunny beach is not at all similar.

The adjustment module 122 compares the calculated FD 116 of each sample image 114 to the FD 130 of the representative frame 128. The adjustment module 122 assigns a weight to each sample image 114. The weight represents how similar a sample image 114 is to the representative frame 128 based on a comparison of the FDs (116, 130). For example, a first sample image 114 may have a weight of 0.3 and a second sample image 114 may have a weight of 0.7, meaning the second image 114 is more similar to the representative frame 128 than the first image 114. The adjustment module 122 interpolates the lookup tables 118 of the sample images 114 based on the weight assigned to each of the sample images 114.

The adjustment module 122 applies the interpolated lookup tables to the representative frame 128. In some embodiments, the lookup tables 118 of a predefined number of most similar sample images 114 are interpolated and applied to the representative frame 128. The adjustment module 122 then creates extreme versions of the representative frame 128. The extreme versions are created by applying the respective interpolated lookup tables for each of the extreme versions to the representative frame 128. The adjustment module 122 displays the representative frame 128, in addition to the extreme versions of the representative frame 128. A user may move a pointer on the representative frame 128 to adjust the brightness/contrast of the representative frame 128. Movement toward an extreme version of the representative frame 128 applies the extreme adjustment to the representative frame. For example, if a user moves a pointer toward the high brightness/high contrast version, the representative frame 128 is displayed with higher brightness and higher contrast. The closer the pointer is to the high brightness/high contrast version, the more the brightness and contrast is increased in the representative frame 128.

The location where the user releases the pointer identifies the final brightness/contrast level desired by the user for the representative frame 128. Application of the final brightness/contrast level desired by the user to the representative frame 128 yields a resultant image. The adjustment module 122 generates a resultant lookup table for the resultant image (i.e., a lookup table that maps each pixel in the representative frame 128 to a changed value in accordance with the final brightness/contrast level desired by the user) and calculates an FD for the resultant image. The location, for example, x,y coordinates of the pointer on the resultant image, is stored with the FD as a user preference 120, for example, in a format of FD:(x,y). The resultant lookup table (i.e., brightness/contrast level) is applied to all frames in the scene 126 of which the representative frame is a part.

When a new scene 126 is to be processed, the adjustment module 122 processes the representative frame 128 of the new scene 126 as described above. However, because the user now has user preferences 120 stored, the adjustment module 122 compares the FD 130 of the representative frame 128 to the FDs that are stored in the user preferences 120. Each of the user preferences 120 includes an FD in addition to x,y coordinates of the final pointer position for the resultant frame in one or more previously adjusted scenes 126. The adjustment module 122 creates a weight vector based on the similarities of the FD 130 of the representative frame 128 of the new scene 126 to FDs of the representative images of the previously adjusted scenes 126. The adjustment module 122 applies the weight vector to the x,y coordinates and normalizes the weight vector to identify x,y coordinates of a starting location of the pointer. The adjustment module 122 displays the representative frame 128 of the new scene 126 with the four extreme versions of the representative frame 128 and places the pointer at the x,y coordinates of the starting location for the representative frame 128 of the new scene 126. Again, the location where the user moves the pointer identifies the final brightness/ contrast level desired by the user for the representative frame 128 of the new scene 126. The adjustment module 122 generates a resultant lookup table for the resultant image (i.e., the representative frame with the adjustment applied) and calculates an FD for the resultant image. The location of the pointer on the resultant image is stored with the FD as a user preference 120 and the resultant lookup table (i.e., brightness/contrast level) is applied to all frames in the scene of which the representative frame is a part.

The adjustment module 122 repeats the above described process for each scene of the video. When all representative frames 128 of all scenes are processed, the scenes 126 are rejoined. In some embodiments, in order to avoid brightness/contrast flickering at changes in successive scenes 126, the adjustment module 122 interpolates the lookup tables for the scenes at the scene boundaries. The interpolated lookup table is then applied to transitional frames of the scenes, for example a last ten frames of a first scene and a first ten frames of an adjacent second scene, smoothing out the brightness/contrast changes at the transition between two successive scenes.

Figure 2:
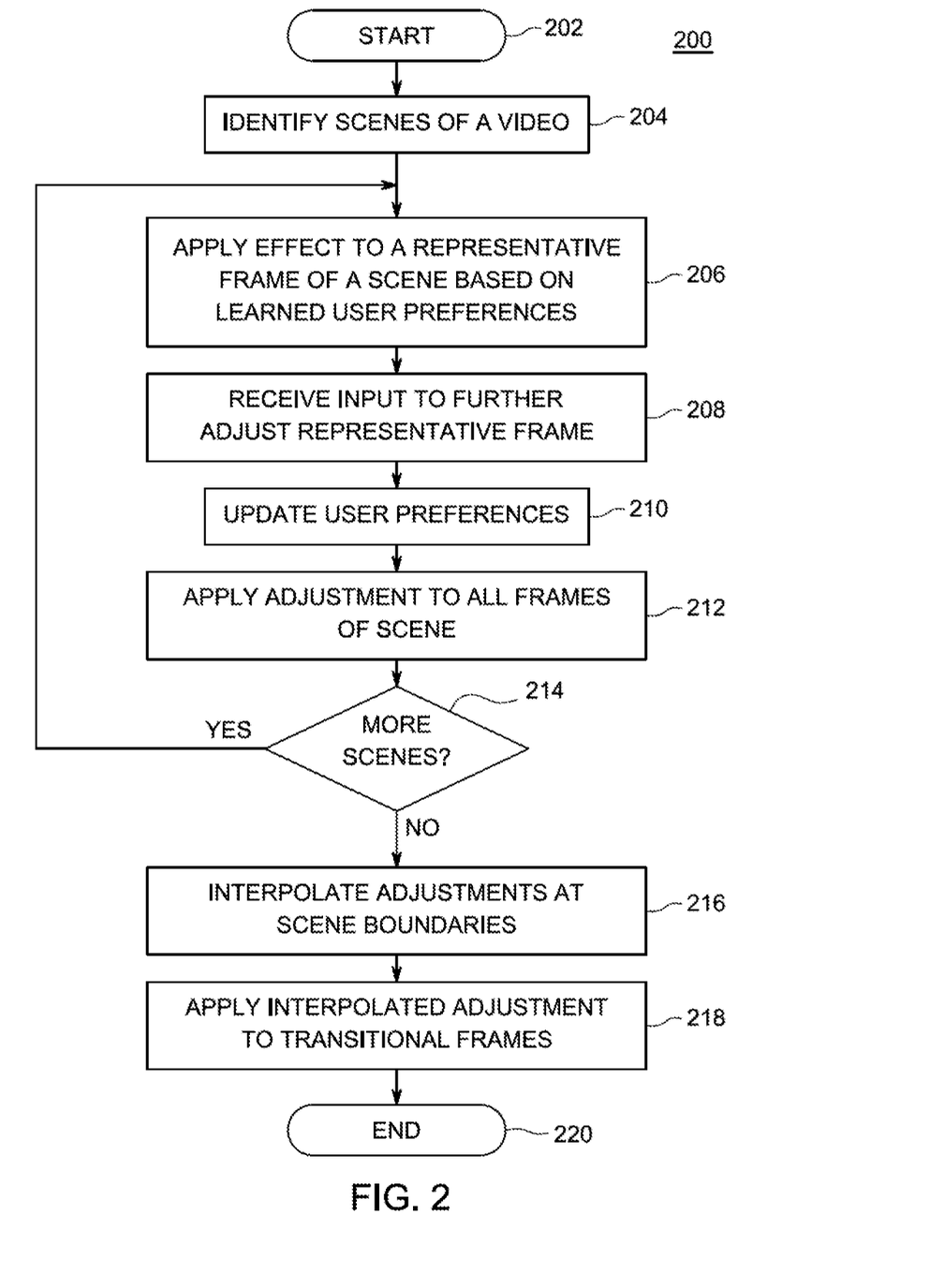
FIG. 2 depicts a flow diagram of a method for editing video scenes based on learned user preferences, as performed by the adjustment module of FIG. 1, according to one or more embodiments.

FIG. 2 depicts a flow diagram of a method 200 for editing video scenes based on learned user preferences, as performed by the adjustment module 122 of FIG. 1, according to one or more embodiments. The method 200 processes each scene of a video individually. The method 200 applies an adjustment of effects to a representative frame of each scene based on learned user preferences and receives an additional adjustment from a user. The method 200 applies the final adjusted effect to all frames of a scene and when all scenes are processed, the method 200 interpolates effects at scene boundaries and applies the interpolated effects to transitional frames of the scenes to create a smooth transition between scenes. The method 200 is initiated when a user accesses a video using video editing software. The method 200 starts at step 202 and proceeds to step 204.

At step 204, the method 200 identifies a plurality of scenes of a video. The method 200 may use various scene detection algorithms to identify the plurality of scenes of the video. For example, the method 200 may use both time code-based scene detection and content-based scene detection. Time code-based scene detection uses time codes in the video to identify a change from a first scene to a second scene of the video. When a new time/date stamp is detected in the video, a scene is detected. Content-based scene detection analyzes the content of the video to identify scene changes. For example, if a first scene was shot indoors, for example, in a dark room and a second scene was shot outdoors, for example on a sunny beach, the content-based scene detection algorithm detects a scene change at the point where the content changed from indoors to outdoors. The lighting effects within a given scene are typically uniform. For example, a beach scene is likely to be brightly lit throughout. Thus, detecting changes in scene lighting typically identifies a scene change. The method 200 proceeds to step 206 and processes each identified scene individually.

At step 206, the method 200 applies an adjustment to a representative frame of a scene based on learned user preferences. The method 200 selects the representative frame from the scene, for example, a frame in the middle of the scene.

The method 200 calculates a feature descriptor for the representative frame. Generally, the FD is an identifier of an image. The FD may range from low level descriptions of luminance distribution to high-level aspects such as face detection. Features may include intensity distributions, scene brightness, equalization curves, detail-weighted equalization curves, highlight clipping, spatial distributions, and faces. The method 200 may computer the FD may using various techniques. The method 200 accesses a large set of sample images (e.g., 250 images). As described above, each sample image is associated with five lookup tables, where four lookup tables include data corresponding to "extreme" versions of the sample images. The four lookup tables of the extreme versions, when interpolated generate a "good" version of a sample image may be, for example, a version adjusted to what a professional photographer would consider ideal for the sample image. The data corresponding to the "extreme" versions of each sample image may provide combinations of adjustments to the sample image, for example, a lowest brightness/lowest contrast version, a lowest brightness/highest contrast version, a highest brightness/lowest contrast version, and a highest brightness/highest contrast version. Each sample image may also include an FD. If an FD has not been calculated for each sample image, the method 200 calculates the FDs for the sample images and stores each FD with its corresponding sample image for future use.

The method 200 compares the FD of the representative frame to the FDs of each of the sample images. If the FD of the representative frame is similar to an FD of a sample image, the similarity indicates a similarity in the features, brightness, contrast, etc. of the representative frame and the sample image. The method 200 calculates a weight for each sample image based on how similar the sample image is to the representative image. For example, if the representative frame is an image of a beach scene on a bright sunny day, a sample image of a beach scene on a partly cloudy day may be weighted 0.7, a sample image of a street scene on a bright sunny day may be weighted 0.3 and a sample image of an indoor scene may be weighted 0.0.

The method 200 interpolates the lookup tables of the sample images based on the calculated weights. The method 200 then applies the interpolated lookup tables to the representative frame. The result when the interpolated lookup tables are applied is that the representative image is adjusted to what a professional perceives as closer to an ideal image. Before the adjusted representative image is displayed to the user, the method 200 applies an additional adjustment based on a user's stored preferences.

Thus, at step 206 the method 200 accesses the user preferences from previously adjusted scenes of the present video as well as previously adjusted scenes of other videos adjusted by the user. The method 200 compares the FD of the representative frame to the FDs that are stored in the user preferences. The method 200 creates a weight vector based on the similarities of the FD of the representative frame to FDs of the resultant images of the previously adjusted scenes. The method 200 applies the weight vector to the x,y coordinates and normalizes the weight vector to identify the x,y coordinates of a starting location of the pointer.

The method 200 applies an additional adjustment to the representative frame based on the identified starting location of the pointer. The method 200 displays the representative frame with the four extreme versions of the representative frame and places the pointer at the identified x,y coordinates of the starting location for the representative frame.

The method 200 proceeds to step 208, where the method 200 receives input via a graphical user interface that identifies a desired adjustment to the representative image. Although a professional may perceive an image as ideal, a user may have different personal preferences. A user may prefer images with more contrast or less brightness than the perceived ideal. The user moves a pointer on the representative image to adjust the effects on the representative image, for example, higher contrast and lower brightness. Movement of the pointer toward an extreme version of the image applies a more extreme adjustment to the representative frame. For example, if a user moves a pointer toward the high brightness/high contrast version, the representative image is displayed with higher brightness and higher contrast. The closer the pointer is to the high brightness/high contrast version, the more the brightness and contrast is increased in the representative frame. The location (i.e., x,y coordinates) of the pointer identifies the degree of the effect used to adjust the representative frame.

When the user has made a final adjustment on the representative frame so it is at a user desired preference, the method 200 generates a resultant lookup table for the resultant image (i.e., the representative frame with the adjustment applied).

The method 200 proceeds to step 210, where the method 200 updates the user preferences based on the adjustment made by the user. The method 200 calculates an FD for the resultant image (i.e., the representative frame with the final adjustment). The method 200 also stores FD and the x,y coordinates for the location of the final pointer position in user preferences, for example, in the format of FD:(x,y).

The method 200 proceeds to step 212, where the method 200 applies the resultant lookup table (i.e., brightness/contrast level) to all frames in the scene.

The method 200 proceeds to step 214, where the method 200 determines whether there are additional scenes that need to be processed. If the method 200 determines that there are additional scenes to be processed, the method 200 proceeds to step 206 and iterates until all scenes of the video have been processed at which time the method 200 proceeds to step 216.

At step 216, the method 200 interpolates adjustments at scene boundaries. A scene boundary is a location in the video where a first scene ends and a second scene begins. In order to avoid flickering of effects at changes in scenes, the method 200 interpolates the lookup tables for the scenes at the scene boundaries. The method 200 interpolates the lookup table for a first scene with a lookup table for a second scene. The method 200 then applies the interpolated lookup table to transitional frames of the scenes. Transitional frames are those frames located near a beginning or an end of a scene at a scene boundary. In some embodiments, a number of transitional frames is predefined, for example a last ten frames of a first scene and a first ten frames of a second scene. In some embodiments, the number of transitional frames is based on a predetermined percentage of frames based on a number of frames of the scene. For example, if a first scene has 300 frames, and the percentage of transitional frames is, for example, 5% of the 300 frames, the number of transitional frames for the first scene is 15 frames. If the second scene has 400 frames, the number of transitional frames for the second scene is 20 frames. As such, the interpolated lookup table is applied to the last 15 frames of the first scene and the first 20 frames of the second scene, making the transition between the two scenes seamless.

The method 200 provides a user the ability to make adjustments to effects in a video on a scene by scene basis. In addition, the method 200 learns the user's preferences over time so as to provide a user with a more useful starting point for adjusting each video scene. The method 200 proceeds to step 220 and ends.

Figure 3:
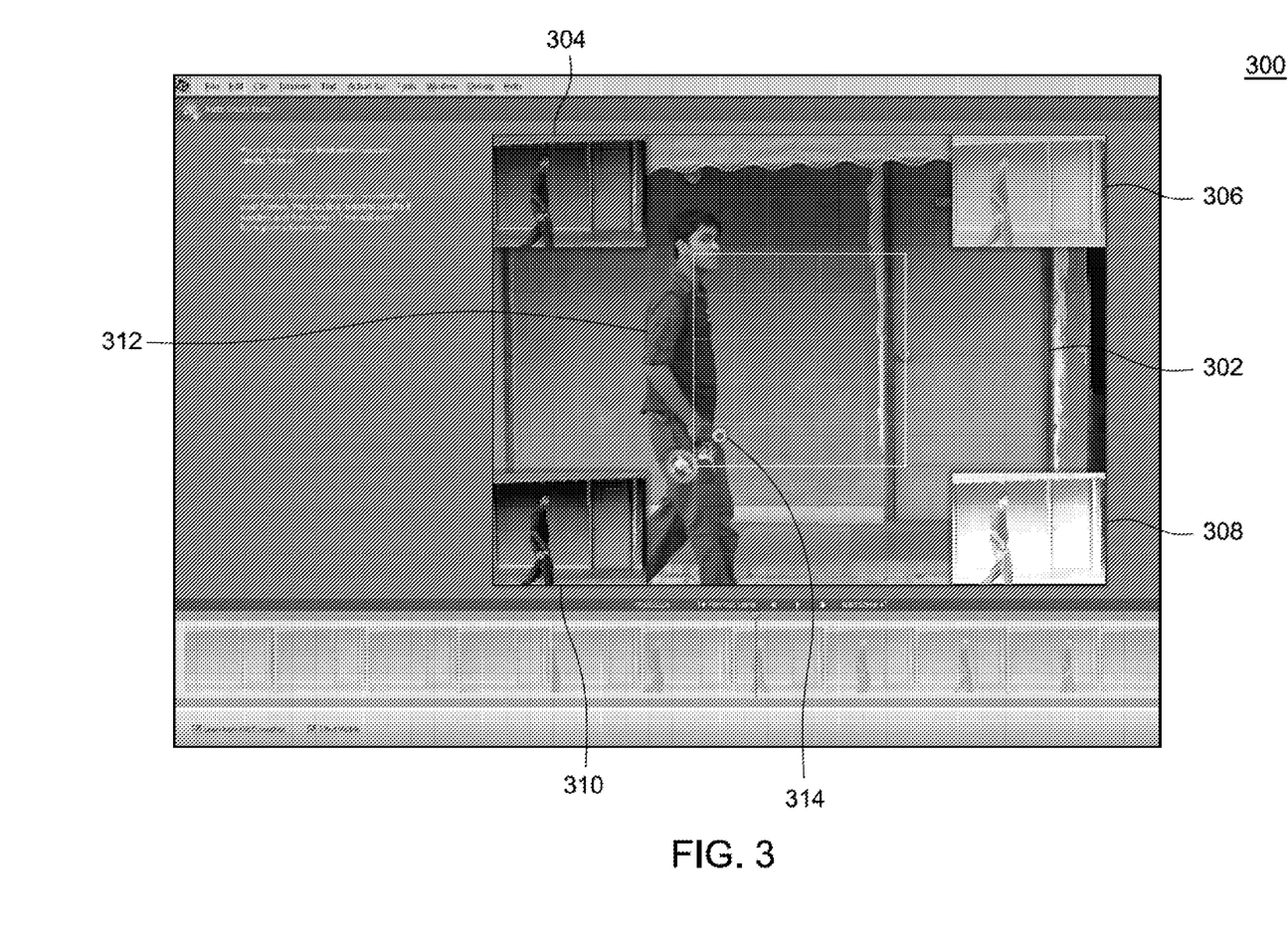
FIG. 3 illustrates a methodology configured in accordance with an embodiment of the present invention.

FIG. 3 illustrates a screen shot 300 configured in accordance with an embodiment of the present invention. The screen shot 300 includes a representative image 302 of a scene of a video. In addition to displaying the representative image 302, extreme versions 304, 306, 308, and 310 are displayed. Extreme version 304 represents a low brightness/low contrast version of the representative image 302. Extreme version 306 represents a high brightness/low contrast version of the representative image 302. Extreme version 308 represents a high brightness/high contrast version of the representative image 302. Extreme version 310 represents a high contrast/high brightness version of the representative image 302. A pointer 314 is provided that can be moved on an x,y grid 312 of the representative image 302. The pointer 314 is placed at a location on the x,y grid 312 in a location that is determined based on the user's preferences. In other words, i when the user edited images in the past, the images that are most similar to the representative image 302 were edited in such a way that the brightness/contrast levels were similar to the brightness/contrast levels applied to the representative image 302 when the pointer 314 is at its current location.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. In a digital medium environment for generating edited digital videos, a computer implemented method comprising:
   receiving an input that adjusts a first level of a digital effect of a first representative frame of a first scene of a plurality of scenes in a digital video, wherein each scene comprises a plurality of digital frames;
   determining a user preference based on the received input;
   modifying the plurality of digital frames of the first scene to have the adjusted level of the digital affect;
   comparing a second representative frame of a second scene of the plurality of scenes in the digital video to the first representative frame;
   determining a second level of the digital effect for the second scene based on the user preference and the comparison of the second representative frame of the second scene of the plurality of scenes in the digital video to the first representative frame, wherein the second level of the digital effect is different than the first level of the digital effect; and
   modifying the plurality of digital frames of the second scene to have the determined second level of the digital effect.

2. The method of claim 1, further comprising providing a user interface displaying a plurality of versions of the first representative frame and a pointer at a first position relative to the plurality of versions of the first representative frame, wherein:
   the plurality of versions of the first representative frame comprise versions of the first representative frame having different levels of the digital effect; and
   receiving the input that adjusts the level of the digital effect of the first representative frame of the first scene comprises receiving input modifying the first position of the pointer relative to the plurality of versions of the first representative frame to a second position relative to the plurality of versions of the first representative frame.

3. The method of claim 2, wherein providing the user interface displaying the plurality of versions of the first representative frame comprises:
   determining weights corresponding to a plurality of sample images based on a similarity of each sample image of the plurality of sample images to the first representative frame, wherein each sample image has corresponding adjustment parameters comprising an adjustment to the level of the digital effect;
   determining a weighted average of the adjustment parameters based on the weights;
   applying the weighted average of the adjustment parameters to the first representative frame to generate the plurality of versions of the first representative frame; and
   providing the plurality of versions of the first representative frame to the user interface.

4. The method of claim 2, wherein determining the user preference further comprises:
   generating a first feature descriptor for the first representative frame; and
   storing the first feature descriptor and the second position of the pointer as the user preference.

5. The method of claim 4, wherein comparing the second representative frame of the second scene of the plurality of scenes in the digital video to the first representative frame comprises:
   comparing the first feature descriptor for the first representative frame from the user preference to a second feature descriptor for the second representative frame to determine a similarity between the first representative frame and the second representative frame; and
   generating a weight vector based on the similarity.

6. The method of claim 5, wherein determining the second level of the digital effect for the second scene based on the comparison and the user preference comprises:
   applying the weight vector to the second position of the pointer from the user preference corresponding to the first representative frame to determine an initial position of the pointer corresponding to the second representative frame; and
   providing the user interface displaying a plurality of versions of the second representative frame and the pointer at the initial position.

7. The method of claim 6, wherein determining the second level of the digital effect for the second scene based on the comparison and the user preference comprises:
   receiving input modifying the initial position to a final position, wherein the final position of the pointer reflects the second level of the digital effect for the second scene.

8. The method of claim 7, further comprising,
generating a modified feature descriptor for the second representative frame based on the second level of the digital effect; and
updating the user preference by storing the modified feature descriptor and the final position of the pointer with the first feature descriptor and the second position of the pointer.

9. The method of claim 1, wherein the digital effect comprises two digital effects and each of the two digital effects comprise at least one of brightness, contrast, sharpness, or saturation.

10. A system comprising:
at least one processor; and
at least one non-transitory computer readable storage medium storing instructions that, when executed by the at least one processor, cause the system to:
receive an input that adjusts a level of a first digital effect of a first representative frame of a first scene of a plurality of scenes in a digital video, wherein each scene comprises a plurality of digital frames;
determine a user preference based on the received input;
modify the plurality of digital frames of the first scene to have the adjusted level of the digital affect;
compare a second representative frame of a second scene of the plurality of scenes in the digital video to the first representative frame;
determine a second level of the digital effect for the second scene based on the user preference and the comparison of the second representative frame of the second scene of the plurality of scenes in the digital video to the first representative frame, wherein the second level of the digital effect is different than the first level of the digital effect; and
modify the plurality of digital frames of the second scene to have the determined second level of the digital effect.

11. The system of claim 10, further comprising instructions that, when executed by the at least one processor, cause the system to:
provide a user interface displaying a plurality of versions of the first representative frame and a pointer at a first position relative to the plurality of versions of the first representative frame, wherein the plurality of versions of the first representative frame comprise versions of the first representative frame having different levels of the digital effect; and
receive the input that adjusts the level of the digital effect of the first representative frame of the first scene by receiving input modifying the first position of the pointer relative to the plurality of versions of the first representative frame to a second position relative to the plurality of versions of the first representative frame.

12. The system of claim 11, further comprising instructions that, when executed by the at least one processor, cause the system to determine the user preference by:
generating a first feature descriptor for the first representative frame; and
storing the first feature descriptor and the second position of the pointer as the user preference.

13. The system of claim 12, further comprising instructions that, when executed by the at least one processor, cause the system to compare the second representative frame of the second scene of the plurality of scenes in the digital video to the first representative frame by:
comparing the first feature descriptor for the first representative frame from the user preference to a second feature descriptor for the second representative frame to determine a similarity between the first representative frame and the second representative frame; and
generating a weight vector based on the similarity.

14. The system of claim 13, further comprising instructions that, when executed by the at least one processor, cause the system to determine the second level of the digital effect for the second scene based on the comparison and the user preference by:
applying the weight vector to the second position of the pointer from the user preference corresponding to the first representative frame to determine an additional position of the pointer corresponding to the second representative frame; and
providing the user interface displaying a plurality of versions of the second representative frame and the pointer at the additional position of the pointer, wherein the additional position of the pointer reflects the second level of the digital effect for the second scene.

15. The system of claim 14, further comprising instructions that, when executed by the at least one processor, cause the system to update the user preference by storing the second feature descriptor and the additional position of the pointer with the first feature descriptor and the second position of the pointer.

16. In a digital medium environment for generating edited digital videos, a computer implemented method comprising:
providing a user interface displaying a plurality of versions of a first representative frame of a first scene of a plurality of scenes in a digital video, wherein each scene comprises a plurality of digital frames, and wherein the plurality of versions of the first representative frame comprise versions of the first representative frame having different levels of a digital effect;
receiving an input that adjusts a first level of the digital effect of the first representative frame;
generating a user preference comprising the adjusted level of the digital effect;
modifying the plurality of digital frames of the first scene to have the adjusted level of the digital affect;
determining a second level of the digital effect for the second scene based the user preference and a comparison of the first representative frame and the second representative frame, wherein the second level of the digital effect is different than the first level of the digital effect; and
modifying the plurality of digital frames of the second scene to have the determined second level of the digital effect.

17. The method of claim 16, further comprising modifying a plurality of transitional frames at a boundary of the first scene and the second scene in the digital video such that levels of the digital effect with regard to the transitional frames interpolate between the adjusted level of the digital effect of the first scene and the second level of the digital effect of the second scene.

18. The method of claim 16, wherein providing the user interface displaying the plurality of versions of the first representative frame comprises:
determining weights corresponding to a plurality of sample images based on a similarity of each sample image of the plurality of sample images to the first representative frame, wherein each sample image has corresponding adjustment parameters comprising an adjustment to the level of the digital effect;
determining a weighted average of the adjustment parameters based on the weights;

applying the weighted average of the adjustment parameters to the first representative frame to generate the plurality of versions of the first representative frame; and providing the plurality of versions of the first representative frame to the user interface.

19. The method of claim 16, wherein generating the user preference comprises generating a first feature descriptor for the first representative frame.

20. The method of claim 16, wherein determining the second level of the digital effect for the second scene based on the first representative frame, the second representative frame, and the user preference comprises:

comparing a first feature descriptor for the first representative frame to a second feature descriptor for the second representative frame to determine a similarity between the first representative frame and the second representative frame;

generating a weight vector based on the similarity; and applying the weight vector to the adjusted level of the digital effect to determine the second level of the digital effect.

\* \* \* \* \*